Patented Mar. 23, 1948

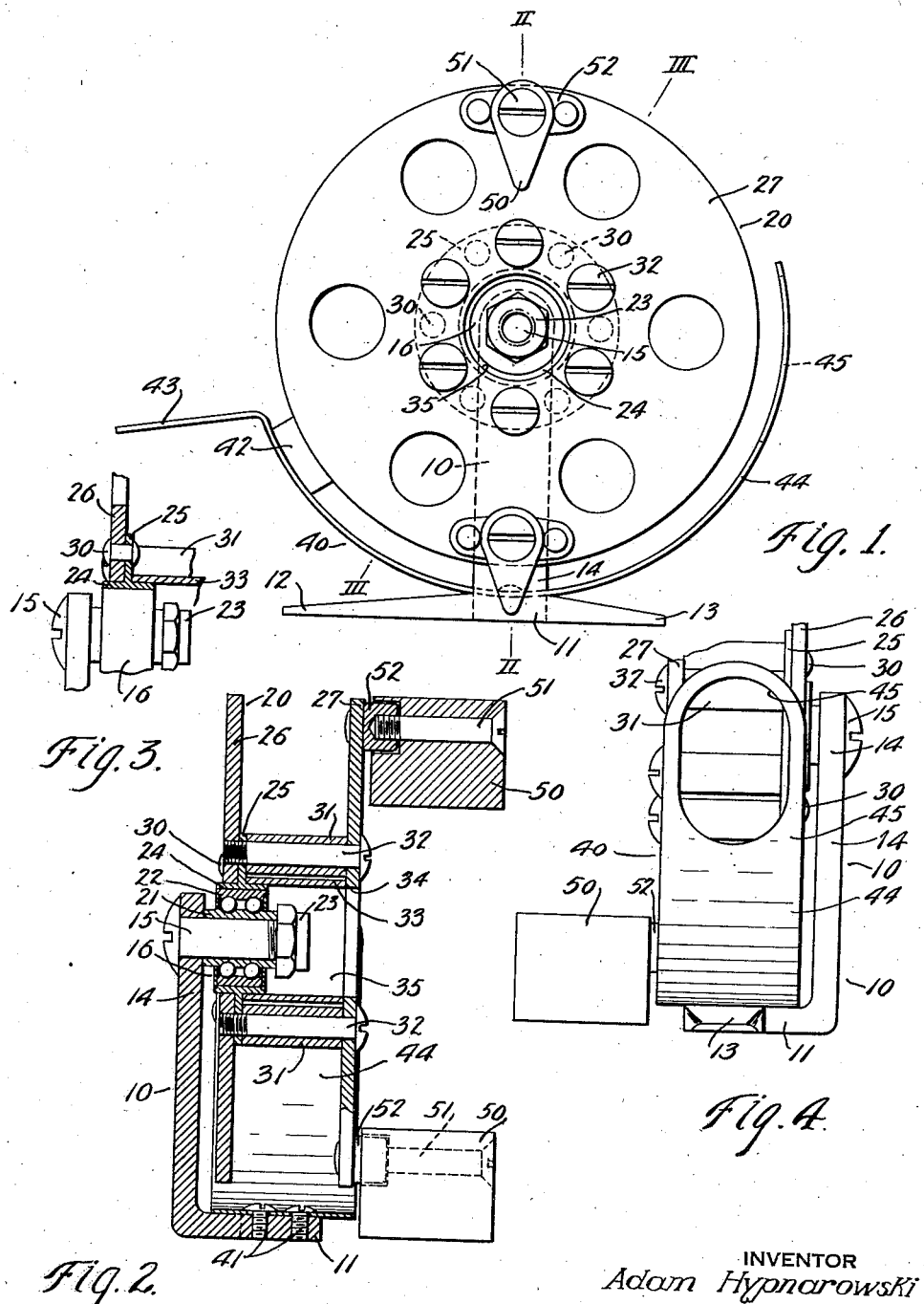

2,438,287

UNITED STATES PATENT OFFICE 2,438,287

FISHING REEL

Adam Hypnarowski, Buffalo, N. Y.

Application January 3, 1946, Serial No. 638,798

1 Claim. (Cl. 242—84.1)

My invention relates in general to fishing reels and more particularly to that type of reel which is designed especially for casting.

The principal object of my invention has been to provide a reel having a spool mounting upon an outboard bearing, whereby the cost of manufacturing the device may be greatly reduced.

Another object has been to provide a fishing reel having relatively few projecting parts which can become caught upon the fishing line or the fisherman's clothing.

Furthermore, my reel is so designed as to be conveniently operated, and is neat and attractive in appearance.

The above objects and advantages have been accomplished by the device shown in the accompanying drawings, of which:

Fig. 1 is a side elevation of the complete device;

Fig. 2 is a sectional view thereof taken on line II—II of Fig. 1;

Fig. 3 is a fragmentary sectional view taken on line III—III of Fig. 1; and

Fig. 4 is a fragmentary end elevation showing the line guide eye.

The device comprises a bearing bracket 10 having a foot 11 formed with longitudinal projections 12 and 13 for convenient attachment to a fishing rod (not shown) in well known manner. The bearing bracket has an upwardly extending arm 14 which carries the bearing stud 15 at its upper end.

Mounted upon the stud 15 is a double-row ball bearing 16 for mounting the spool 20. This bearing comprises an inner race 21 and an outer race 22. The inner race is preferably longer than the outer race and it is mounted directly upon the stud 15 and acts as a spacer, as shown in Fig. 2, to maintain the spool in spaced relation with the arm 14 of the bracket. A nut 23 serves to secure the bearing upon the stud. Arranged about the outer race 22 of the bearing is a bearing sleeve 24 which is provided with an annular flange 25 disposed preferably at or near the longitudinal center thereof.

The spool 20 comprises an inner disk 26 and an outer disk 27. The inner disk is mounted upon the bearing sleeve 24 and adjacent one side of the annular flange 25 to which it is secured preferably by means of rivets 30.

The outer disk 27 is held in spaced relation with the disk 26 by means of separators 31 arranged between the outer disk and the flange 25, and held in place by means of retaining screws 32 which preferably pass through the outer disk, the separators, and are screw-threaded into the flange 25 and inner disk 26. Also arranged between the inner surface of the outer disk 27 and the outer face of the flange 25 is a hub sleeve 33. The inner end of this sleeve is mounted upon a projecting end of the bearing sleeve 24, and an opening 34 is preferably formed in the outer disk which registers with the interior periphery of the hub sleeve, whereby a recess 35 is provided in which the nut 23 of the bearing stud is mounted.

A leaf spring 40 is arranged about a portion of the peripheries of the inner and outer flanges 26 and 27 and is preferably in concentrical spaced relation therewith. This spring may be secured to the foot 11 of the bearing bracket 10 by means of screws 41. The portion of the spring facing the operator is provided at its upper curved end with a brake pad 42 for engagement with the peripheral surfaces of both spool disks. Extending inwardly from the upper curved end of the spring and toward the operator is a thumb-engaging member 43. At the opposite side of the reel, the portion 44 of the leaf spring is extended up preferably beyond the horizontal center line of the reel and is provided with a line eye 45.

Suitable handles 50 are provided for the spool and they are preferably arranged at 180° from each other. These handles are secured to the outer disk 27 by means of crank pins 51, preferably in the form of screws having countersunk heads and engaging nut pieces 52, carried by the disk.

What is claimed is:

A fishing reel comprising a spool having an inner disk and an outer disk in spaced relation to said inner disk, separator means securing said disks in spaced relation, a centrally arranged bearing sleeve having an outwardly extending mounting flange located near its longitudinal center, said inner disk being mounted upon one end of said bearing sleeve and attached to said mounting flange, a hub sleeve having one end mounted upon said bearing sleeve and its opposite end bearing against said outer disk, and an anti-friction bearing mounted within said bearing sleeve, a bracket for supporting said spool, and means for mounting said bearing upon said bracket.

ADAM HYPNAROWSKI.

REFERENCES CITED

The following references are of record in the file of this patent:

UNITED STATES PATENTS

| Number | Name | Date |
|---|---|---|
| 352,926 | Meisselbach | Nov. 23, 1886 |
| 726,655 | Dreiser | Apr. 28, 1903 |
| 1,398,197 | Moses | Nov. 22, 1921 |
| 1,856,047 | Adams | Apr. 26, 1932 |
| 1,865,066 | Walberg | June 28, 1932 |
| 1,958,919 | Kovalovsky | May 15, 1934 |
| 2,059,763 | Wenzel | Nov. 3, 1936 |

FOREIGN PATENTS

| Number | Country | Date |
|---|---|---|
| 4,391 | Great Britain | July 13, 1911 |
| 20,591 | Great Britain | Oct. 12, 1901 |